US010029339B2

(12) United States Patent
Nishimura

(10) Patent No.: US 10,029,339 B2
(45) Date of Patent: Jul. 24, 2018

(54) ROTARY TABLE

(71) Applicant: FANUC Corporation, Yamanashi (JP)

(72) Inventor: Takuma Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 15/050,003

(22) Filed: Feb. 22, 2016

(65) Prior Publication Data

US 2016/0243660 A1    Aug. 25, 2016

(30) Foreign Application Priority Data

Feb. 24, 2015  (JP) ................................. 2015-033874
Jan. 29, 2016  (JP) ................................. 2016-016012

(51) Int. Cl.
    *B23Q 16/10*        (2006.01)

(52) U.S. Cl.
    CPC ...... *B23Q 16/105* (2013.01); *B23Q 2220/004* (2013.01)

(58) Field of Classification Search
    CPC .......... B23Q 16/105; B23Q 1/28; B23Q 1/52; B23Q 16/10; B23Q 5/54; B16D 55/22; F16D 65/18
    See application file for complete search history.

(56) References Cited

U.S. PATENT DOCUMENTS

| 7,798,302 B2 * | 9/2010 | Matsumura ........... F16D 27/112 192/200 |
| 8,398,061 B2 * | 3/2013 | Tatsuda ................ B23Q 16/102 269/216 |
| 8,448,543 B2 * | 5/2013 | Tatsuda ................ B23Q 16/102 269/57 |
| 2005/0097976 A1 | 5/2005 | Nitta |
| 2010/0175505 A1 | 7/2010 | Tatsuda |
| 2010/0243383 A1 | 9/2010 | Korischem et al. |
| 2010/0319487 A1 | 12/2010 | Tatsuda |
| 2012/0175982 A1 | 7/2012 | Yamagishi et al. |
| 2015/0239087 A1 | 8/2015 | Itou |

FOREIGN PATENT DOCUMENTS

| CN | 1613604 A | 5/2005 |
| CN | 103240612 A | 8/2013 |
| CN | 104858672 A | 8/2015 |
| DE | 10332424 B4 | 4/2006 |
| DE | 102011115636 A1 | 12/2012 |
| DE | 102012008797 B3 | 8/2013 |
| DE | 102012004467 A1 | 9/2013 |

(Continued)

OTHER PUBLICATIONS

Decision to Grant a Patent in JP Application No. 2016-016012, dated May 31, 2016.

(Continued)

*Primary Examiner* — Thomas C Diaz
(74) *Attorney, Agent, or Firm* — Hauptman Ham, LLP

(57) ABSTRACT

A rotary table includes a clamping mechanism including a piston driven by operating fluid in a direction of either of clamping and unclamping a brake disc, and a biasing means fixed by a case and the piston to always bias the piston in a direction of either of clamping and unclamping the brake disc by a recovery force of elastic deformation.

6 Claims, 4 Drawing Sheets

(56) References Cited

FOREIGN PATENT DOCUMENTS

| | | |
|---|---|---|
| EP | 0294871 A1 | 12/1988 |
| EP | 2475078 A2 | 7/2012 |
| JP | 4-105832 A | 4/1992 |
| JP | 10-220425 A | 8/1998 |
| JP | 2009-018391 A | 1/2009 |
| JP | 2009-18392 A | 1/2009 |
| JP | 4732734 B2 | 7/2011 |
| JP | 5057568 B2 | 10/2012 |
| JP | 5468581 B2 | 4/2014 |
| JP | 2015-521261 A | 7/2015 |

OTHER PUBLICATIONS

Office Action in DE Application No. 102016001884.4 dated May 22, 2017.
Office Action in JP Application No. 2016-016012, dated Mar. 29, 2016.
Office Action in CN Application No. 201610101858.6, dated Jul. 21, 2017, 12 pp.

* cited by examiner

ROTARY TABLE

RELATED APPLICATIONS

The present application claims priority to Japanese Patent Application Number 2015-033874 filed Feb. 24, 2015 and Japanese Patent Application Number 2016-016012 filed Jan. 29, 2016, the disclosure of which is hereby incorporated by reference herein in its entirety.

BACKGROUND OF THE INVENTION

1. Field of the Invention

The present invention relates to a rotary table.

2. Description of the Related Art

A rotary table is, for example, mounted in a machine tool that is controlled by a numerical controller, and is used to secure a workpiece, a jig, and the like on a rotating portion of the rotary table for indexing, rotation supporting, and other purposes.

Such a rotary table is arranged with a clamping mechanism that takes a more important role than other components of the rotary table because how quickly this clamping mechanism operates affects a cycle time for processing a workpiece with a machine tool, i.e. such a clamping mechanism is directly linked to the processing capability.

An indexing rotary table or a rotary table supporting a cradle type rotary jig, which is arranged in a numerically controlled (NC) machine tool, usually has a built-in clamping mechanism that operates pneumatically, hydraulically, or other means. Such a built-in clamping mechanism is normally provided with a biasing mechanism for biasing the clamping mechanism in a clamping or unclamping direction when no power, such as pneumatic or hydraulic power, is supplied.

A method using a coil spring, which method is disclosed in JP 4732734 B2, is widely applied in such a biasing mechanism arranged in a rotary table because the method is advantageous for a compact-sized device since such a coil spring does not require a larger space for installation. However, such a method requires more operating fluid to fill a space for accommodating the coil spring, which could lead to reduced responsiveness in a clamping mechanism. Moreover, such a method using a coil spring is also disadvantageous because the method makes difficult to apply a function for preventing a piston from being rotated, in addition to insufficient clamping torque.

In JP 5057568 B2, to solve these problems, rotation stopping and biasing functions, which were difficult to achieve in a piston-structured clamping mechanism, are achieved through a structure in which a brake disc is clamped with a spring member without using a piston method in a normally-clamping type indexing rotary table. However, since the structure disclosed in JP 5057568 B2 basically uses a spring member for either clamping or unclamping, it is difficult to pneumatically drive the structure for both clamping and unclamping operations, unlike a typical piston structure.

JP 5468581 B2 discloses a brake structure for a rotary table, in which structure an elastically deformable clamping member is used for selecting a clamped or unclamped state while operating fluid is supplied, or a clamped state while operating fluid is not supplied. However, in the structure disclosed in JP 5468581 B2, because a piston does not face a pressure chamber as can be seen in a piston structure, a pneumatic path might be complicated, thus the operating speed could be affected.

SUMMARY OF THE INVENTION

In view of the above problems in the conventional art, the present invention has an object to provide a rotary table provided with a piston type clamping mechanism achieving with a simple structure a biasing function and a rotation stopping function for demonstrating enough responsiveness and clamping torque.

According to an aspect of the present invention, a rotary table includes a case, a shaft, a brake disc, and a clamping mechanism. The shaft is rotatably arranged in the case, and is able to secure a workpiece, a jig, and the like at an end. The brake disc is relatively, unrotatably arranged to the shaft. The clamping mechanism clamps the brake disc so that the shaft cannot rotate inside the case, and unclamps the brake disc so that the shaft can rotate inside the case. The clamping mechanism includes a piston and a biasing means. The piston is driven by operating fluid in a direction of clamping or unclamping the brake disc. The biasing means is fixed by the case and the piston to always bias the piston in a direction of either of clamping and unclamping by a recovery force of elastic deformation.

According to the configuration of the present invention described above, a biasing function and a rotation stopping function can be achieved through a simple structure to provide a rotary table that includes a piston type clamping mechanism demonstrating enough responsiveness and clamping torque.

Further, the biasing means may be a disc-shaped spring member.

BRIEF DESCRIPTION OF THE DRAWINGS

The above described and other objects and features of this invention will become apparent by referring to the preferred example embodiments described in the following specification and shown in the accompanying drawings, in which.

DETAILED DESCRIPTION OF THE PREFERRED EMBODIMENTS

A description will hereinafter be given of two embodiments of the present invention with consultation of drawings.

Figure 1:
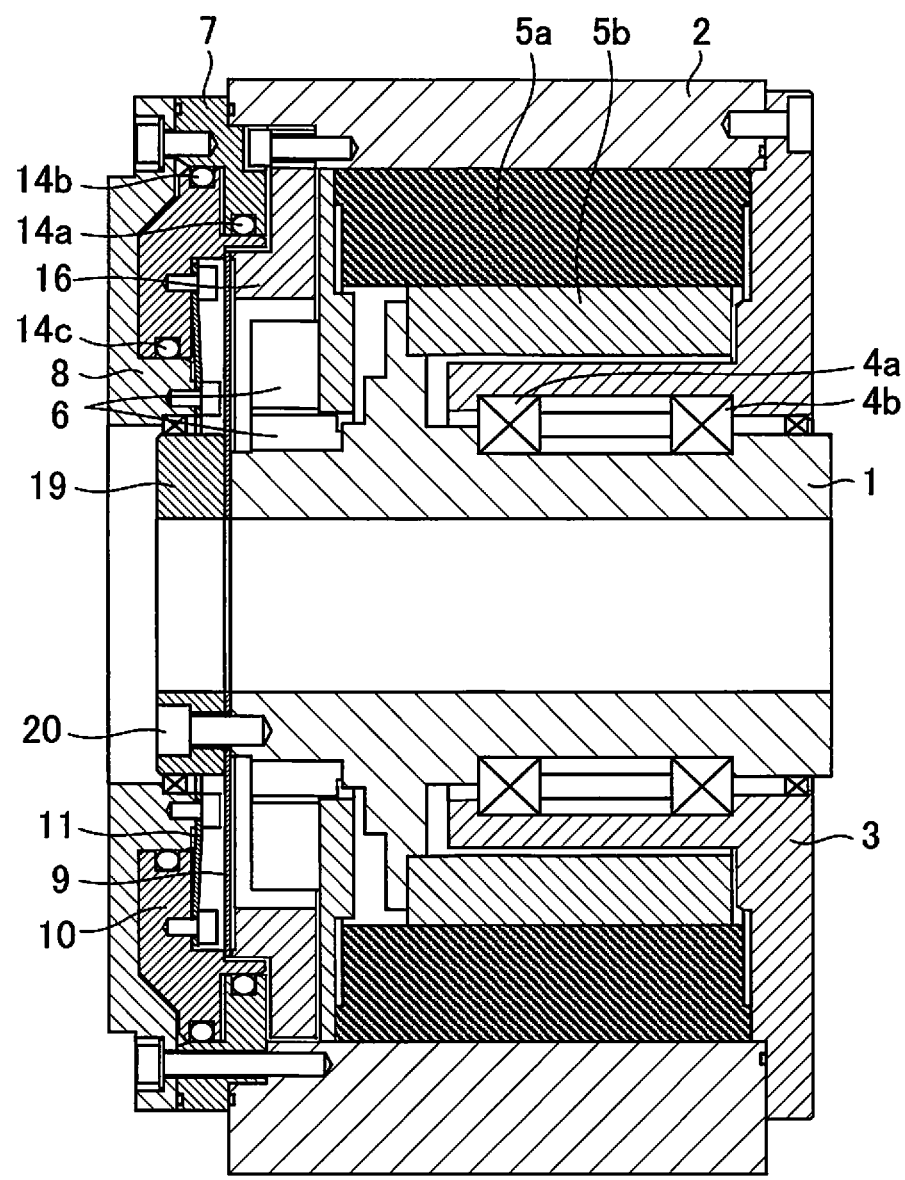
FIG. 1 is a cross-sectional view illustrating the entire structure of a directly-driven rotary table according to an embodiment of the present invention.

FIG. 1 is a cross-sectional view entirely illustrating a normally-clamping type indexing rotary table having a direct drive mechanism. Such a rotary table may be mounted for use, for example, on a machining table for a machine tool.

A shaft 1 is rotatably supported via main bearings 4a and 4b by a housing 3 fixed to a case 2. A stator 5a of a motor for rotating the shaft 1 is fixed to the housing 3. A rotor 5b of the motor is attached to the shaft 1. The shaft 1 attached with the rotor 5b is rotatably supported relative to the case 2. An encoder 6 (a detection side is fixed to the case 2, while an encoder plate is fixed to the shaft 1) for detecting a rotation position and a speed of the shaft 1, a cylinder 7, and a rear plate 8 are also fixed to the case 2.

A brake disc 9 is tightly held between an end face of the shaft 1 and an end face of a mounting member 19. The mounting member 19 is fixed to the shaft 1 with a bolt 20. Thereby the brake disc 9 is coupled to the shaft 1 so as to freely rotate relative to the case 2. A piston 10 is accommodated in a groove shaped portion configured with the rear plate 8 and the cylinder 7.

Figure 2:
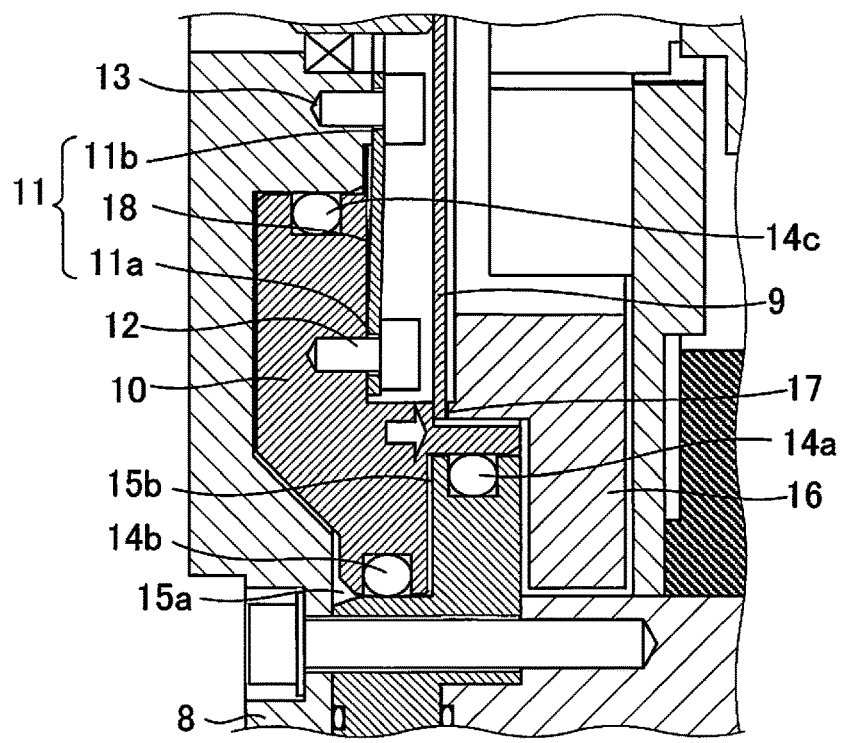
FIG. 2 is an enlarged, detailed cross-sectional view illustrating a clamping mechanism of the directly-driven rotary table according to the embodiment of the present invention (detailed cross-sectional view when the clamping mechanism is in a clamped state)
Figure 3:
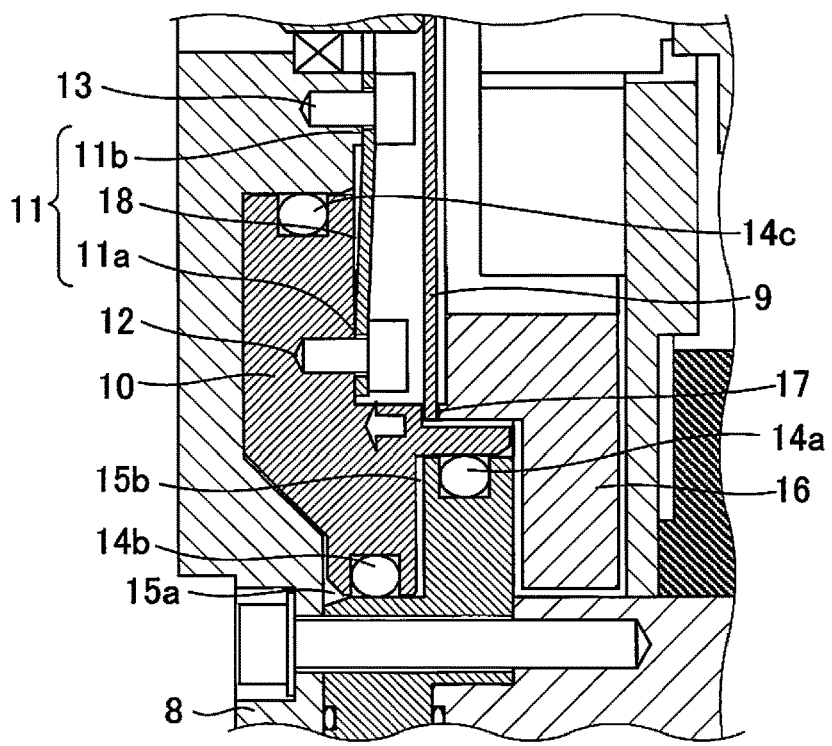
FIG. 3 is an enlarged, detailed cross-sectional view illustrating the clamping mechanism of the directly-driven rotary table according to the embodiment of the present invention (detailed cross-sectional view when the clamping mechanism is in an unclamped state)

FIGS. 2 and 3 are detailed cross-sectional views illustrating a clamping mechanism of a directly-driven rotary table, where FIG. 2 is a view when the clamping mechanism is in a clamped state, while FIG. 3 is a view when the clamping mechanism is in an unclamped state.

A spring disc 11, i.e. a spring member, is configured with fixing portions 11a and 11b and a supporter 18 supporting (in other words, "coupling") the fixing portions 11a and 11b. The spring disc 11 is fixed to the piston 10 through the fixing portion 11a, and is fixed to the rear plate 8 through the fixing portion 11b. Thereby the piston 10 is prevented from being rotated relative to the case 2.

Openings are provided at the fixing portion 11a of the spring disc 11 to allow bolts 12 to pass through. The bolts 12 are passed through the openings at the fixing portion 11a so as to be screwed in bolt holes provided at the piston 10. Openings are provided at the fixing portion 11b of the spring disc 11 to allow bolts 13 to pass through. The bolts 13 are passed through the openings at the fixing portion 11b so as to be screwed in bolt holes provided at the rear plate 8. Through the structure described above, the piston 10 is immobilized relative to the case 2. A means of fixing the spring disc 11 to the case 2 and the piston 10 is not limited to a means using bolts, but any means may be applied, such as welding.

The spring disc 11 is configured so that the brake disc 9 is always biased in a clamping direction by a repellent force due to elastic deformation of the supporter 18 supporting both the fixing portions 11a and 11b.

The piston 10 is arranged in the groove shaped portion via sealing materials 14a, 14b, and 14c so as to move back and forth by compressed air. Inside the groove shaped portion is separated by the piston 10 into an air chamber 15a for clamping and an air chamber 15b for unclamping. Air to be supplied into the two air chambers is controlled by an electromagnetic valve arranged in the rotary table.

When a clamping command is input, the electromagnetic valve (not shown) operates to allow compressed air to flow into the air chamber 15a, and compressed air in the air chamber 15b to exit so as to move the piston 10 toward the brake disc 9. Accordingly the brake disc 9 is tightly held between the piston 10 and a clamping surface 17 of a clamping member 16 fixed to the case 2, and thus the shaft 1 is immobilized. On the other hand, when an unclamping command is input, the electromagnetic valve operates to allow compressed air to flow into the air chamber 15b, and compressed air in the air chamber 15a to exit so as to move the piston 10 in a reverse direction. Accordingly the brake disc 9 that was tightly held between the piston 10 and the clamping surface 17 is released, and thus the shaft 1 can rotate freely.

In some cases, the spring disc 11 may be configured to always bias the brake disc 9 in an unclamping direction by a repellent force due to elastic deformation (recovery force of elastic deformation) of the supporter 18 supporting both the fixing portions 11a and 11b. In this case, when no compressed air is supplied, the brake disc 9 is always unclamped, and thus the shaft 1 can rotate freely.

A rotary table having a direct drive mechanism has been described in the above embodiment of the present invention. The present invention is also applicable to a rotary table having another driving mechanism (such as a worm gear structure), as well as a rotary table without having a driving mechanism.

Figure 4:
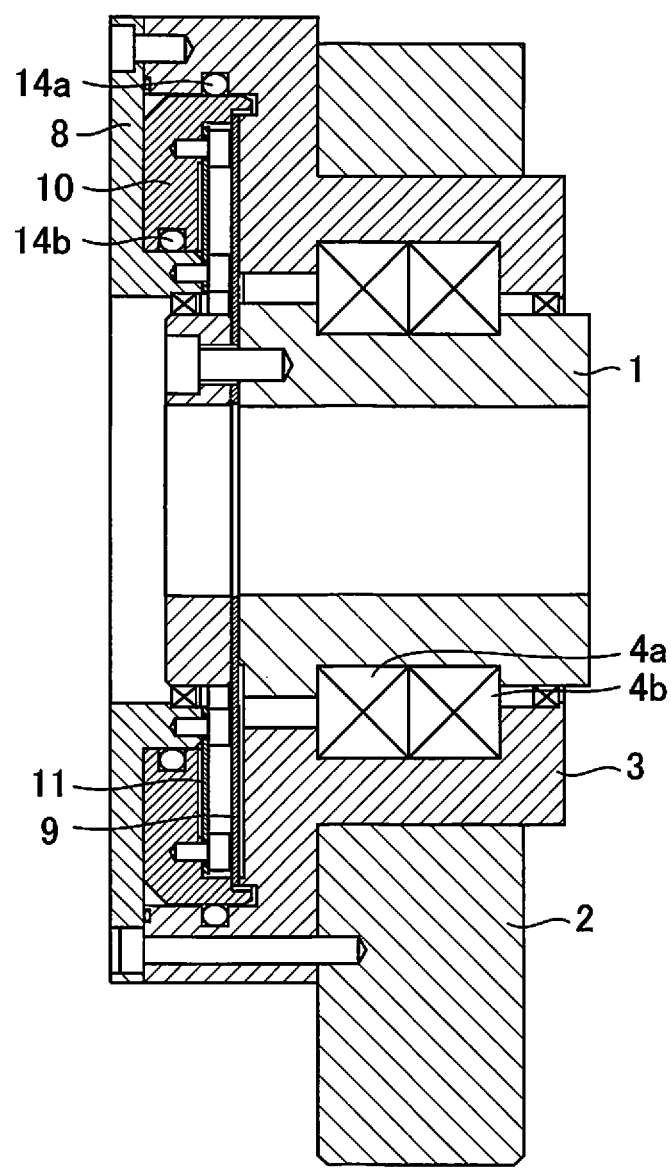
FIG. 4 is a cross-sectional view illustrating the entire structure of a rotary table without having a driving mechanism according to another embodiment of the present invention.

FIG. 4 is a cross-sectional view entirely illustrating a normally-unclamping type rotary table without having a driving mechanism (rotary table supporting a cradle type rotary jig). A shaft 1 is rotatably supported via main bearings 4a and 4b by a housing 3 fixed to a case 2. A rear plate 8 is also fixed to the housing 3. A brake disc 9 is coupled to the shaft 1 so as to freely rotate relative to the case. A piston 10 is accommodated in a groove shaped portion configured with the rear plate 8 and the housing 3.

Figure 5:
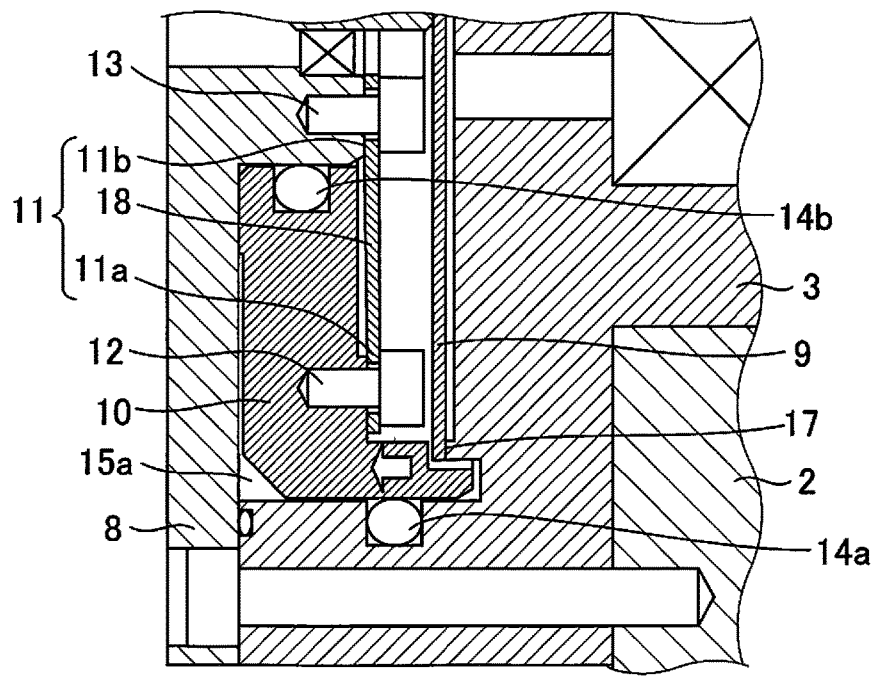
FIG. 5 is an enlarged, detailed cross-sectional view illustrating a clamping mechanism of the rotary table without having a driving mechanism according to the other embodiment of the present invention (detailed cross-sectional view when the clamping mechanism is in an unclamped state)
Figure 6:
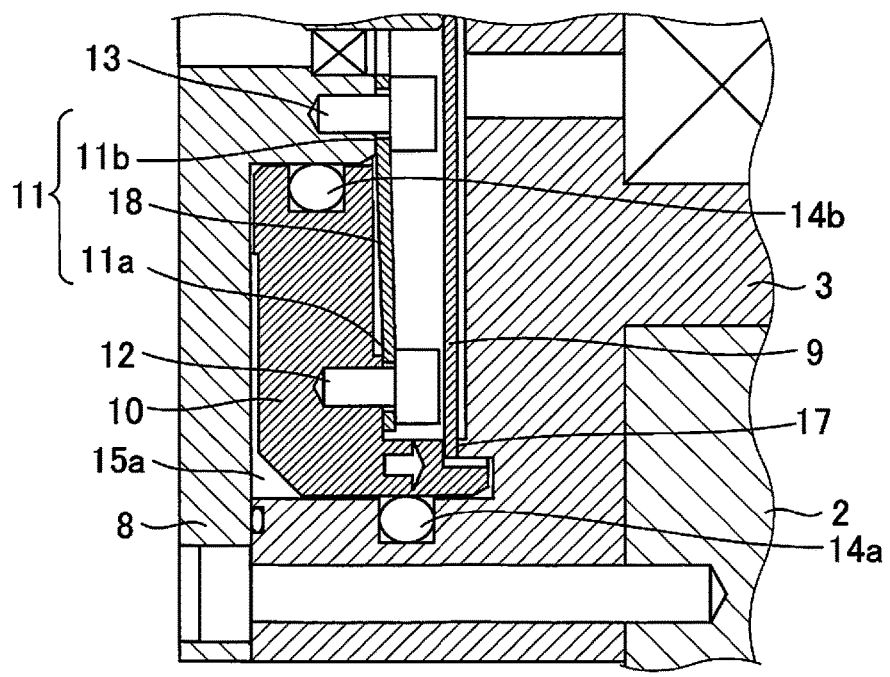
FIG. 6 is an enlarged, detailed cross-sectional view illustrating the clamping mechanism of the rotary table without having a driving mechanism according to the other embodiment of the present invention (detailed cross-sectional view when the clamping mechanism is in a clamped state).

FIGS. 5 and 6 are enlarged, detailed cross-sectional views illustrating a clamping mechanism of a rotary table without having a driving mechanism, where FIG. 5 is a detailed cross-sectional view when the clamping mechanism is in an unclamped state, while FIG. 6 is a detailed cross-sectional view when the clamping mechanism is in a clamped state.

Fixing portions 11a and 11b of a spring disc 11 of a spring member are respectively fixed to the piston 10 and the rear plate 8, thereby the piston 10 is immobilized relative to the shaft 1. The spring disc 11 is configured to always bias the brake disc 9 in an unclamping direction by a repellent force due to elastic deformation of a supporter 18 supporting both the fixing portions 11a and 11b.

The piston 10 is arranged in the groove shaped portion via sealing materials 14a and 14b so as to move back and forth by compressed air. An air chamber 15a for clamping is arranged in the groove shaped portion via the piston 10. Air to be supplied into the air chamber 15a is controlled by an electromagnetic valve or the like separately arranged outside the rotary table.

When a clamping command is input, the electromagnetic valve operates to allow compressed air to flow into the air chamber 15a so as to move the piston 10 toward the brake disc 9. Accordingly the brake disc 9 is tightly held between the piston 10 and a clamping surface 17 of the housing 3, and thus the shaft 1 is immobilized. On the other hand, when an unclamping command is input, the electromagnetic valve operates to allow compressed air in the air chamber 15a to exit so as to move the piston 10 in a reverse direction by a biasing effect due to elastic deformation of the spring disc 11. Accordingly the brake disc 9 that was tightly held between the piston 10 and the clamping surface 17 is released, and thus the shaft 1 can rotate freely. When no compressed air is supplied, the brake disc 9 is always unclamped through the above configured spring disc 11, and thus the shaft 1 can rotate freely.

Although the spring disc 11 described in the above two embodiments of the present invention has a plate shape (disc shape) with a certain thickness, on which a through hole is arranged in a center to allow the shaft 1 to pass through, the thickness may not be constant provided that a certain condition is satisfied. Further, the spring disc may be separated, instead of a single plate.

According to the embodiments of the present invention, even a conventional piston type clamping mechanism used in an indexing rotary table or a rotary table supporting a cradle type rotary jig can possess rotation stopping and biasing functions, while demonstrating enough responsiveness and clamping torque.

Two embodiments of the present invention have been described. However, the present invention is not limited to the above described example embodiments, but can be implemented in other embodiments by adding required amendments and modifications.

The invention claimed is:

1. A rotary table, comprising:
   a case;
   a shaft rotatably arranged in the case, and configured to secure an object at an end of the shaft;
   a motor housed in the case, the motor having a stator and a rotor, the motor configured to rotate the shaft;
   a brake disc relatively, unrotatably arranged to the shaft; and
   a clamping mechanism
      for clamping the brake disc so that the shaft is not rotatable inside the case, and
      for unclamping the brake disc so that the shaft is rotatable inside the case,
   wherein
   the clamping mechanism comprises:
      a clamping member fixed to the case;
      a piston driven by operating fluid in a direction of either of clamping and unclamping the brake disc; and
      a biasing unit fixed by the case and the piston, always biasing the piston in a direction of either of clamping and unclamping the brake disc by a recovery force of elastic deformation,
   the piston is configured to
      move toward the brake disc, to hold the brake disc between the piston and the clamping member of the clamping mechanism, and
      move away from the brake disc, to release the brake disc from being held by the piston and the clamping member, and
   the piston, the clamping member, and the rotor and stator of the motor are aligned with one another along a central axis of the shaft,
   wherein the biasing unit comprises a spring disc having
      two fixing portions fixed to the case and the piston, respectively, and
      a supporter between the two fixing portions, and
   the spring disc is configured to always bias the brake disc in a direction of either of clamping and unclamping by a repellent force due to elastic deformation of the supporter of the spring disc.

2. The rotary table according to claim 1, wherein the biasing unit comprises a disc-shaped spring member.

3. The rotary table according to claim 1, wherein the piston is configured to be driven by the operating fluid to either move toward the brake disc in the direction of clamping the brake disc or move away from the brake disc in the direction of unclamping the brake disc.

4. The rotary table according to claim 1, wherein the piston is configured to be driven by the operating fluid to come into directly contact with the brake disc in the direction of clamping the brake disc.

5. A rotary table, comprising:
   a case;
   a shaft rotatably arranged in the case, and configured to secure an object at an end of the shaft;
   a brake disc relatively, unrotatably arranged to the shaft; and
   a clamping mechanism configured
      to clamp the brake disc and to prevent the shaft from rotating inside the case, and
      to unclamp the brake disc and to permit the shaft to rotate inside the case,
   wherein the clamping mechanism comprises:
      a clamping member fixed to the case;
      a piston configured to be driven by operating fluid in a direction of either of clamping and unclamping the brake disc; and
      a biasing unit fixed by the case and the piston, and configured to always bias the piston in a direction of clamping the brake disc by a recovery force of elastic deformation,
   the piston is configured to
      move toward the brake disc, to hold the brake disc between the piston and the clamping member of the clamping mechanism, and
      move away from the brake disc, to release the brake disc from being held by the piston and the clamping member,
   the biasing unit comprises a spring disc having
      two fixing portions fixed to the case and the piston, respectively, and
      a supporter between the two fixing portions, and
   the spring disc is configured to always bias the brake disc in a direction of either of clamping and unclamping by a repellent force due to elastic deformation of the supporter of the spring disc.

6. A rotary table, comprising:
   a case;
   a shaft rotatably arranged in the case, and configured to secure an object at an end of the shaft;
   a brake disc relatively, unrotatably arranged to the shaft; and
   a clamping mechanism configured
      to clamp the brake disc and to prevent the shaft from rotating inside the case, and
      to unclamp the brake disc and to permit the shaft to rotate inside the case,
   wherein the clamping mechanism comprises:
      a clamping member fixed to the case;
      a piston configured to be driven by operating fluid in a direction of either of clamping and unclamping the brake disc; and
      a biasing unit fixed by the case and the piston, and configured to always bias the piston in a direction of unclamping the brake disc by a recovery force of elastic deformation,
   the piston is configured to move toward the brake disc, to hold the brake disc between the piston and the clamping member of the clamping mechanism, and move away from the brake disc, to release the brake disc from being held by the piston and the clamping member, the biasing unit comprises a spring disc having two fixing portions fixed to the case and the piston, respectively, and a supporter between the two fixing portions, and the spring disc is configured to always bias the brake disc in a direction of either of clamping and unclamping by a repellent force due to elastic deformation of the supporter of the spring disc.

* * * * *